United States Patent [19]
Motoda

[11] Patent Number: 4,966,513
[45] Date of Patent: Oct. 30, 1990

[54] INDOOR TYPE MECHANIZED STORAGE FACILITY

[75] Inventor: Kenro Motoda, Tokyo, Japan

[73] Assignee: Motoda Denshi Kogyo Kabushiki Kaisha, Kamikitazawa, Japan

[21] Appl. No.: 326,748

[22] Filed: Mar. 21, 1989

[30] Foreign Application Priority Data

Mar. 23, 1988 [JP] Japan .................................. 63-69060

[51] Int. Cl.⁵ ............................................ B65G 65/00
[52] U.S. Cl. .................... 414/277; 414/352; 414/389; 414/399; 414/609
[58] Field of Search ............... 414/254, 264, 278, 279, 414/280, 352, 389, 391, 399, 573, 609, 498, 267, 277, 281, 661

[56] References Cited

U.S. PATENT DOCUMENTS

| | | | |
|---|---|---|---|
| 3,507,406 | 4/1970 | Zollinger | 414/278 |
| 4,116,511 | 9/1978 | Di Liddo | 414/277 X |
| 4,148,404 | 4/1979 | Heisler | 414/259 |
| 4,279,563 | 7/1981 | Miller | 414/277 X |
| 4,459,078 | 7/1984 | Chiantella et al. | 414/498 X |
| 4,543,026 | 9/1985 | Halonen et al. | 414/352 |
| 4,690,602 | 9/1987 | Castaldi et al. | 414/280 |
| 4,690,611 | 9/1987 | Nobuhara | 414/259 X |
| 4,752,176 | 6/1988 | Linder | 414/278 |
| 4,804,307 | 2/1989 | Motoda | 414/288 |

FOREIGN PATENT DOCUMENTS

| | | | |
|---|---|---|---|
| 0031470 | 3/1977 | Japan | 414/279 |
| 0003203 | 1/1981 | Japan | 414/280 |
| 1175810 | 8/1985 | U.S.S.R. | 414/280 |

Primary Examiner—Joseph E. Valenza
Assistant Examiner—James R. Bidwell
Attorney, Agent, or Firm—Lackenbach Siegel Marzullo & Aronson

[57] ABSTRACT

A indoor-type mechanized storage facility includes a box-shaped casing and an elevator device coupled to the casing. The casing contains a plurality of storage portions which are aligned with each other, and a passageway portion which is formed in front of the storage portions. The elevator device includes an elevator tower which protrudes in a building, and a lifter which supplies the storage unit in the casing to an opened portion of the elevator tower. The casing is disposed in an empty space or below the floor in the building. The mechanized storage facility also includes a conveying car which moves in the passageway portion and conveys the storage unit between the casing and the elevator device, and a control device that controls the operation of the conveying car and that of the elevator device. The conveying car has a transversely conveying device that conveys the storage unit substantially in the horizontal direction to accommodate it in the storage portion. In consequence, a desired storage unit which is selected from the plurality of storage units can be conveyed onto the floor regardless of the accommodated position of the storage unit so as to enable the objects to be stored in or taken out of the storage unit.

11 Claims, 16 Drawing Sheets

INDOOR TYPE MECHANIZED STORAGE FACILITY

BACKGROUND OF THE INVENTION

1. Field of the Invention:

The present invention relates to a mechanized storage facility, and more particularly, to an indoor type mechanized storage facility which has a size that enables it to be moved from one place to another, and which is provided in an empty space, under the floor or in an attic in a building, or in the earth near the building so that the goods are put in and taken out through an opening protruding into a room or a closet.

2. Description of the Related Art:

A variety of sub-floor storage boxes have recently been developed in order to solve the problem of the shortage in storage space within a building. Further, closet type storage units have also been proposed to increase the efficiency with which the goods are stored in a house.

In the conventional sub-floor storage boxes, a casing is provided between the floor and the ground, and the objects are put in or taken out of the casing through an opening formed in the floor. In consequence, an operator must bend his body or kneel down when he stores goods in the storage box or takes goods out of the storage box. These make the conventional sub-floor storage box an inconvenient one.

Further, when the goods stored deep in the above-described sub-floor storage boxes or the closet-type storage units are to be taken out, the operator has to insert his hand to reach the goods. Alternatively, he must use a tool to reach the goods.

SUMMARY OF THE INVENTION

In view of the aforementioned problems of the prior art, an object of the present invention is to provide an indoor-type mechanized storage facility which is formed into a facility by combining small freight handling devices, which is small in size, and in which the storage and taking out of the goods are mechanized and performed efficiently.

To this end, the present invention provides a mechanized storage facility which is small enough to be carried out from one place to another, which has an opening that opens into the interior of a building, and which satisfies the following requirements. The mechanized storage facility includes a box-shaped casing, an elevator device coupled to the casing, a plurality of storage units accommodated in the casing, a conveying car that travels within the casing to convey the storage unit between the casing and the elevator device, and a control device for controlling the operation of the conveying car and that of the elevator device. The casing and the elevator device may also be formed as separate units which are small enough to be carried out from one place to another.

The casing is disposed in an empty space, below the floor or in an attic in a building, or in the earth near the building. A plurality of storage portions are aligned with each other in the casing. A passageway portion is formed in front of the plurality of storage portions. Rails on which a conveying car travels are provided in the passageway portion. Although the storage units are provided in any number of rows, in one form, they may be provided in one row or two with the passageway portion being formed therebetween.

The storage unit has a locking protrusion on the undersurface thereof. It also has a pair of protrusions on the two side surfaces thereof. The locking protrusion is used when the storage unit is drawn out and pushed into the storage portion. In one example, the locking protrusion are a pair of protrusions which are respectively formed on a first edge portion of the undersurface of the storage unit which is closer to the passageway portion and on a second edge portion remote from the first edge portion. The protrusions are used when the storage unit is lifted. They may be angle or channel bars fixed to the side walls of the storage unit. Alternatively, the side walls of the storage unit may be shaped into the form of an angle or channel bar by a pressing machine. Casters may be provided on the undersurface of the storage unit to facilitate the movement thereof. If the storage unit is not very heavy, no caster may be provided.

The conveying car includes a travelling device that moves back and forth on the rails, and a transversely conveying device that moves the storage unit substantially in the horizontal direction and thereby conveys it to or away from the storage portion.

The transversely conveying device includes a conveyor that moves back and forth in the direction in which the storage unit is transversely conveyed. The conveyor has an engaging member that engages with the locking member of the storage unit through a predetermined rotational angle and thereby moves the storage unit. A wrapping connector driving device may be used as the conveyor. The engaging members are provided on a power transmitting means such as chains at predetermined intervals. The engaging member is engaged with the locking member only through the predetermined rotational angle of the power transmitting means and thereby draws the storage unit out of the storage portion or pushes it into the storage portion.

The elevator device includes an elevator tower and a lift which is provided in the elevator tower in such a manner that it can rise and fall. The upper portion of the elevator tower, in which an opening is provided, protrudes into the building. The lower portion of the elevator tower communicates with the passageway portion. The lift has supporting members which hold the protrusions provided on the side surfaces of the storage unit from below and lift the storage unit from the conveying car.

Although the elevator tower may be coupled to the casing at any position, in one preferred form, it is coupled to the casing at the end of the passageway portion. Various types of driving devices can be used to drive the lift. However, they must be the ones that can eliminate the movement of the storage unit in the horizontal direction when it is conveyed to or from the conveying car. That is, they must be the ones that allow the conveying car with the storage unit placed thereon to be located immediately below the lift and allow the supporting members to hold the protrusions on the side surfaces of the storage unit from below so as to lift the storage unit up from the conveying car.

An opening is formed on the side surface of the storage unit and on the side surface of the upper portion of the elevator device that faces the side surface of the storage unit so that the objects can be handled therethrough. Further, an opening may also be formed at the top of the storage unit and at the top of the elevator device so that the objects can be handled therethrough.

The control device is provided in, for example, the upper portion of the elevator tower. It includes a means through which an operator can input control data, and a microcomputer with a control program that operates the travelling device, the transversely conveying device and the lift incorporated therein. The control device may be of a relay sequence type that does not employ a microcomputer.

The storage unit may be small enough to be taken out of the elevator device. Alternatively, it may have a larger size.

DETAILED DESCRIPTION OF THE PREFERRED EMBODIMENTS

The present invention will now be described by way of example with reference to the accompanying drawings. First, a first embodiment of the present invention will be described with reference to FIGS. 1 to 16.

Figure 1:
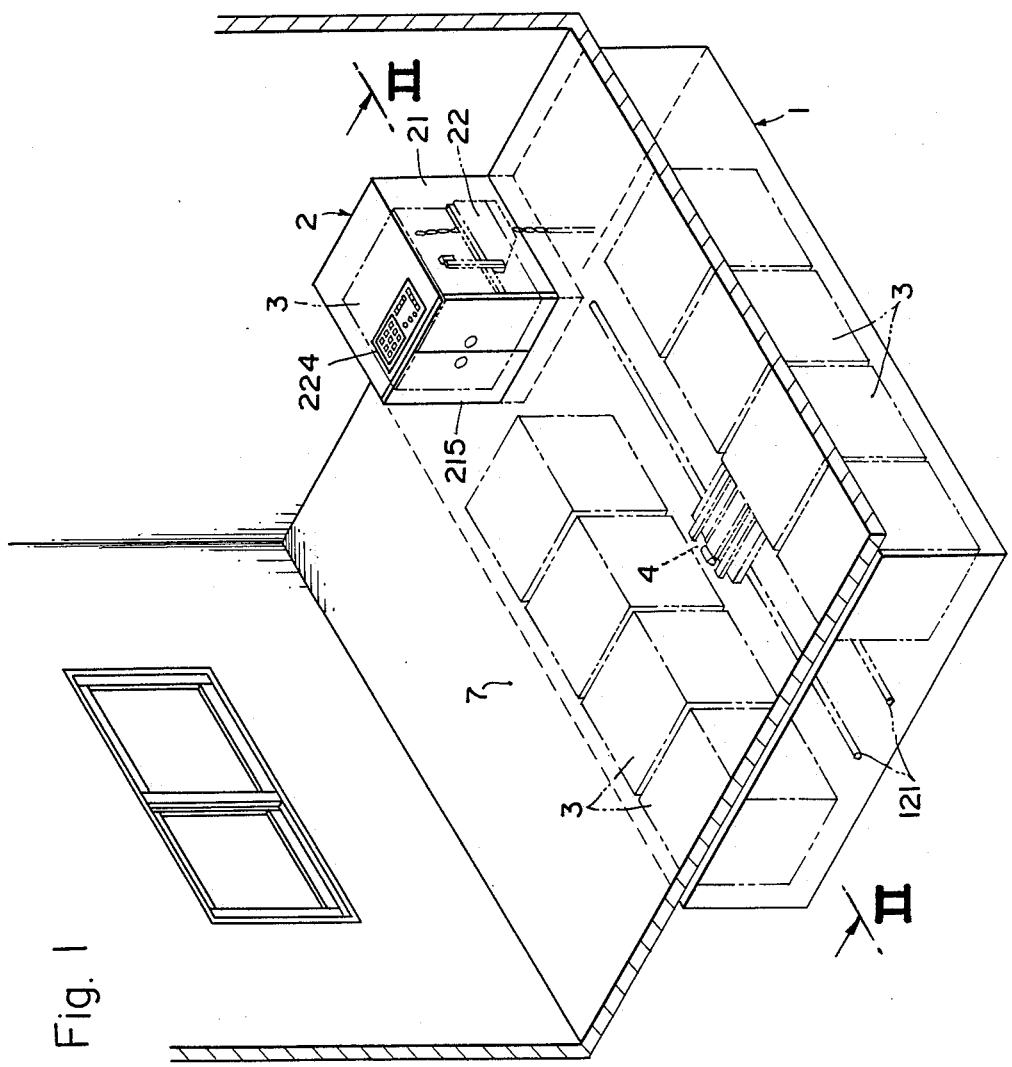
FIG. 1 is a perspective view of a storage facility which is disposed below the floor, showing a first embodiment of the present invention.
Figure 3:
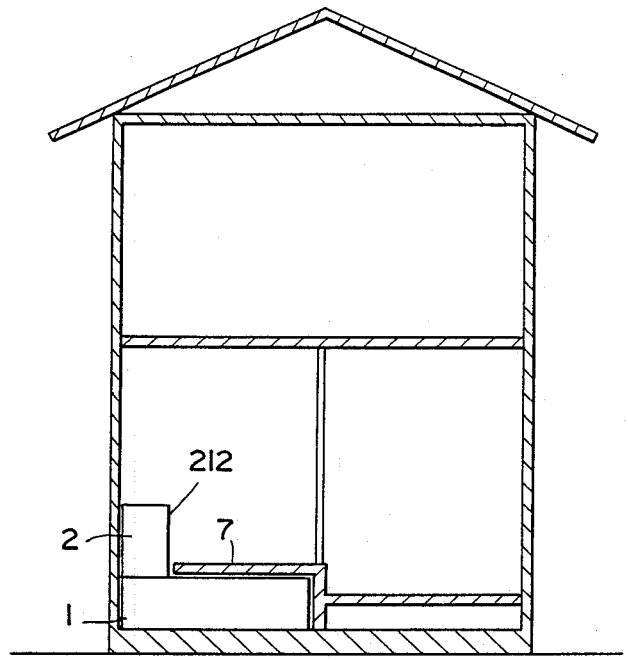
FIG. 3 is a cross-sectional view of a building in which the embodiment shown in FIG. 1 is disposed, showing the arrangement of the storage facility in the building.

As shown in FIGS. 1 and 3, an indoor-type mechanized storage facility of this embodiment includes a box-shaped casing 1, an elevator device 2 coupled to one end of the casing 1, a plurality of storage units 3 accommodated in the casing 1, a conveying car 4 that travels in the casing 1 to convey the storage unit 3 between the casing 1 and the elevator device 2, and a control panel 224 with a control device for controlling the operation of the conveying car 4 and that of the elevator device 2 incorporated therein.

The mechanized storage facility has a size that enables it to be carried out from one place to another. The casing 1 and the elevator device 2 are manufactured as separate units. They may be combined with each other in a factory or at an installation site after they have been carried there. In this embodiment, substantially the entire casing 1 is buried in the earth under a floor 7 of a building with the top of the elevator device 2 protruding above the floor 7, as shown in FIG. 3.

Figure 2:
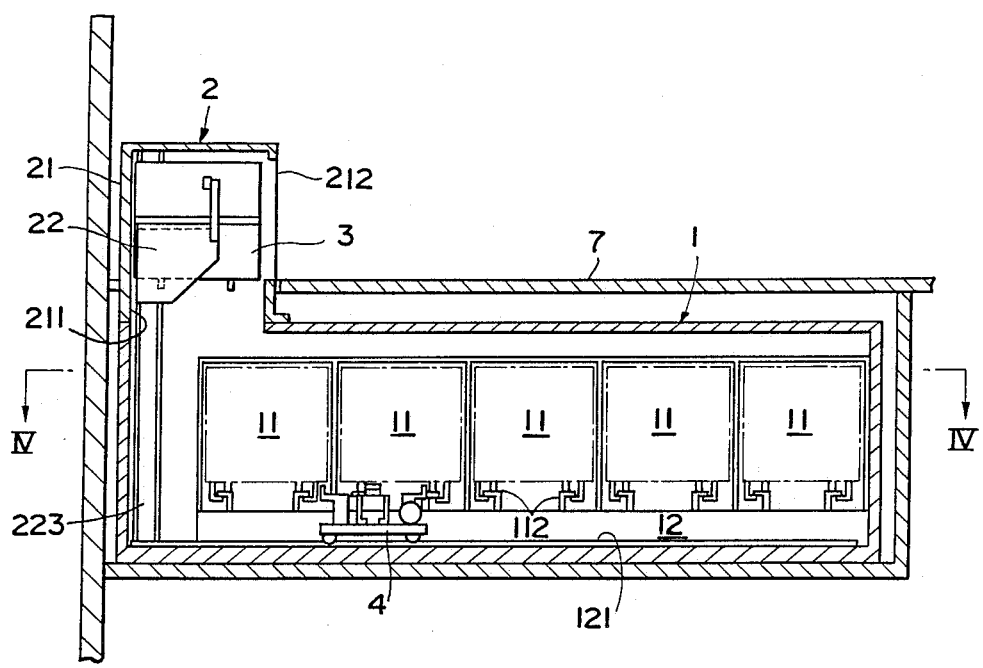
FIG. 2 is a vertical cross-section taken along the line II—II of FIG. 1 and seen when looking in the direction indicated by the arrows.
Figure 4:
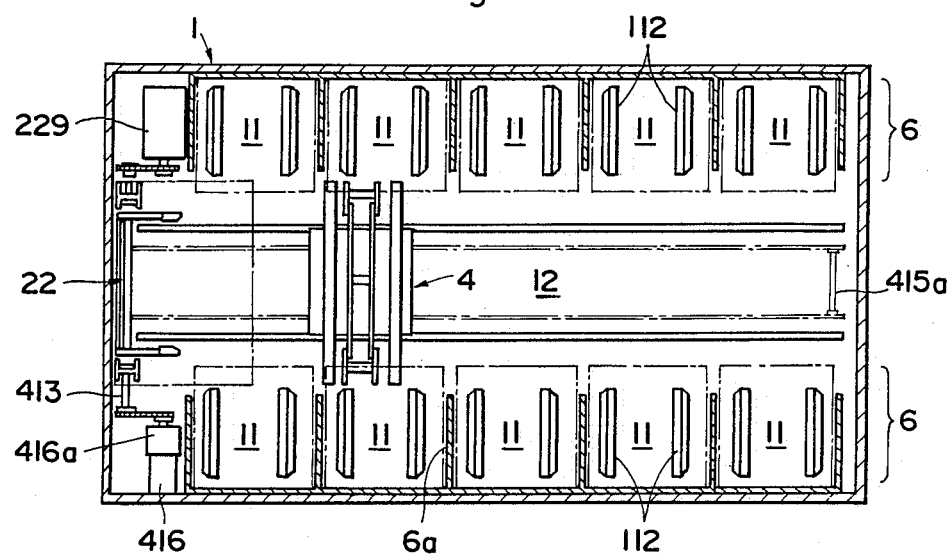
FIG. 4 is a cross-section taken along the line IV—IV of FIG. 2 as seen when looking in the direction indicated by the arrows.

As shown in FIGS. 2 and 4, the interior of the casing 1 is divided into a storage area 6 and a passageway area 12. The storage area 6 is divided into a plurality of storage portions 11 that are aligned with each other in the longitudinal direction of the casing 1. In this embodiment, two rows of storage areas 6 oppose each other with the passageway area 12 being interposed therebetween. As stated above, the storage area 6 is divided into a plurality of storage portions 11, which are aligned with each other. The passageway area 12 is formed in front of this plurality of storage portions 11.

Figure 5:
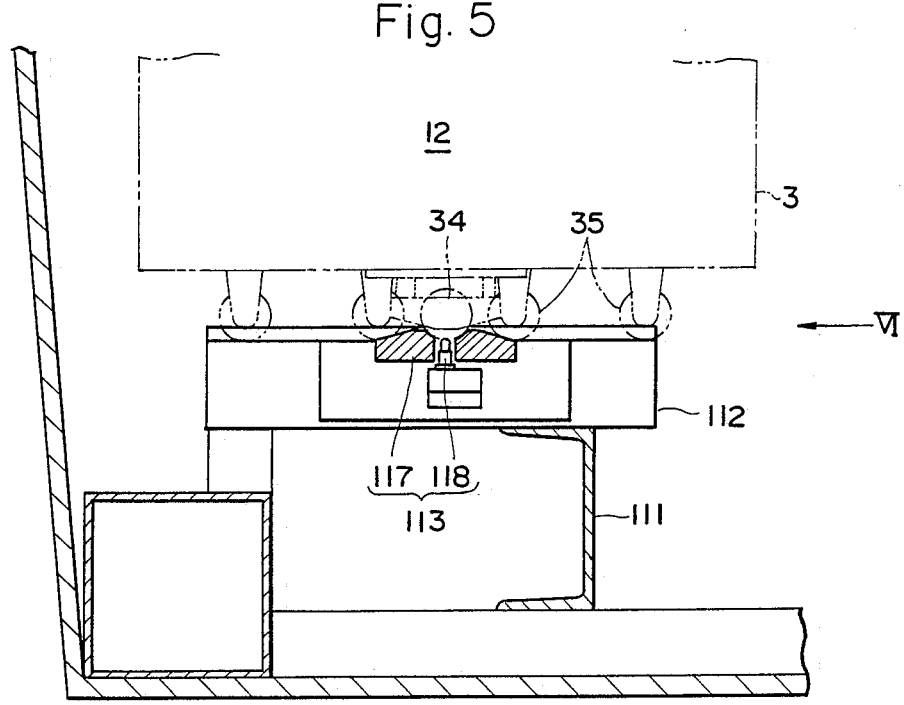
FIG. 5 is an enlarged vertical cross-sectional view of a storage portion formed in a casing.
Figure 6:
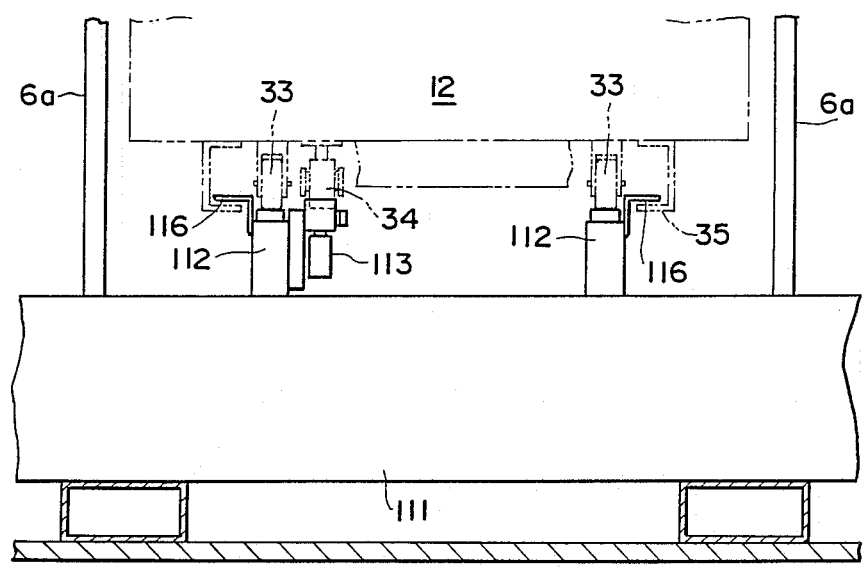
FIG. 6 is an enlarged front view of the storage portion as seen when looking in the direction indicated by the arrow VI of FIG. 5.

On the floor of each of the storage portions 11 is provided a base frame 111 on which the storage unit 3 is placed, as shown in FIGS. 5 and 6. A pair of rails 112 are mounted on the base frame 111 so as to allow the storage unit 3 to run therealong. As shown in FIG. 5, the base frame 111 is made of a channel bar. A plurality of connectors 115 are provided on the front side of the base frame 111, that is, on the side of the base frame 111 that faces the passageway portion 12, so as to enable power to be supplied to the conveying car 4. Each of the rails 112 has a thick plate-like form, as shown in FIG. 6. A travel guide 116 having an inverted L-shaped form is mounted on the outer side of each of the rails 112. A positioning device 113 is provided on the inner side of one of the rails 112 so as to allow the storage unit 3 to be located at a fixed position when the storage unit 3 is accommodated in the storage portion 11. Also, the positioning device 113 detects the storage unit 3 when it is located at that fixed position.

The positioning device 113 includes a pair of cam guides 117, and a limit switch 118 with a detecting end protruding from between the two cam guides 117. The positioning device 113 has the function of locating the storage unit 3 at a fixed position in the storage portion 11. It also has the function of sending a detection signal that represents the presence of the storage unit 3 to the control panel 224.

Figure 10:
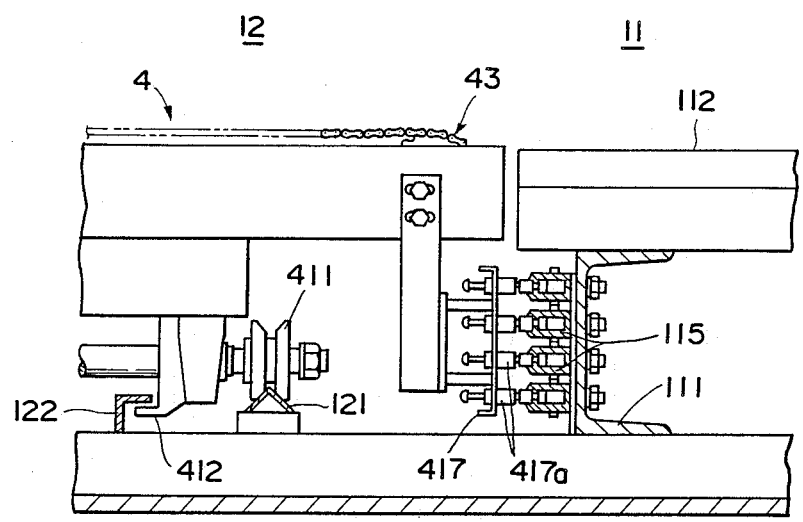
FIG. 10 is an enlarged front view of the essential parts of the conveying car, showing a current collector structure of the conveying car.
Figure 11:
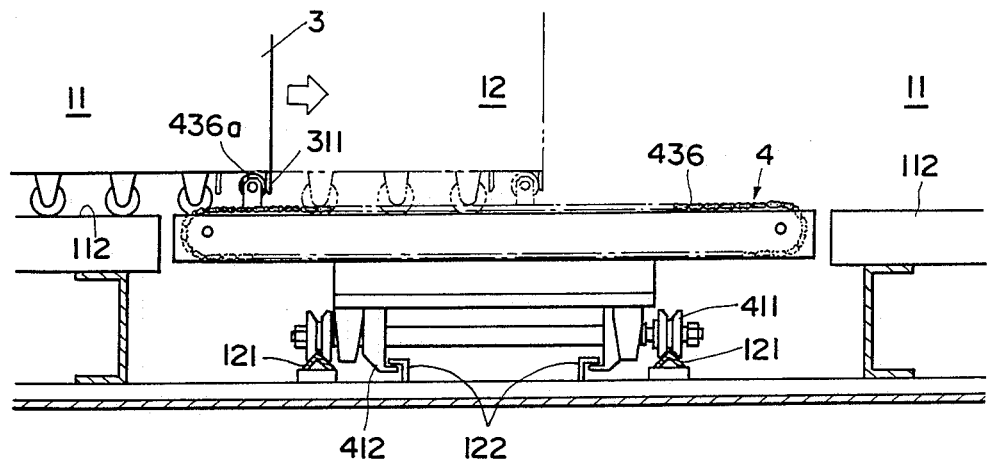
FIG. 11 is a side elevational view, showing a state where the storage unit is drawn out by a transversely conveying device.
Figure 12:
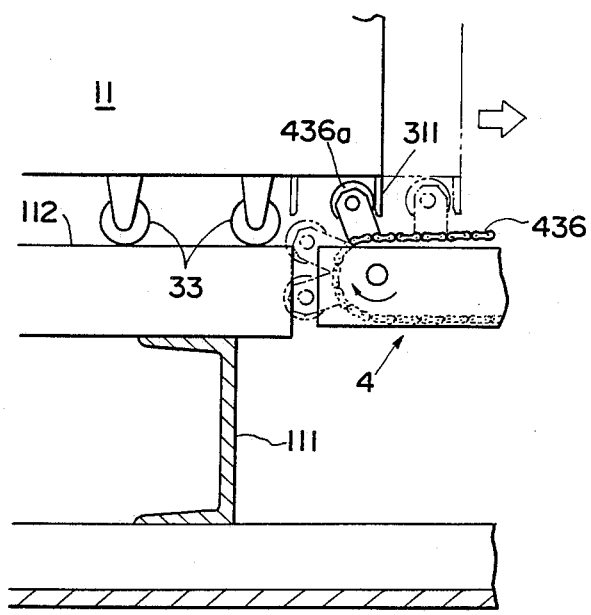
FIG. 12 is an enlarged side elevational view, showing the state where the storage unit is drawn out by the transversely conveying device.
Figure 13:
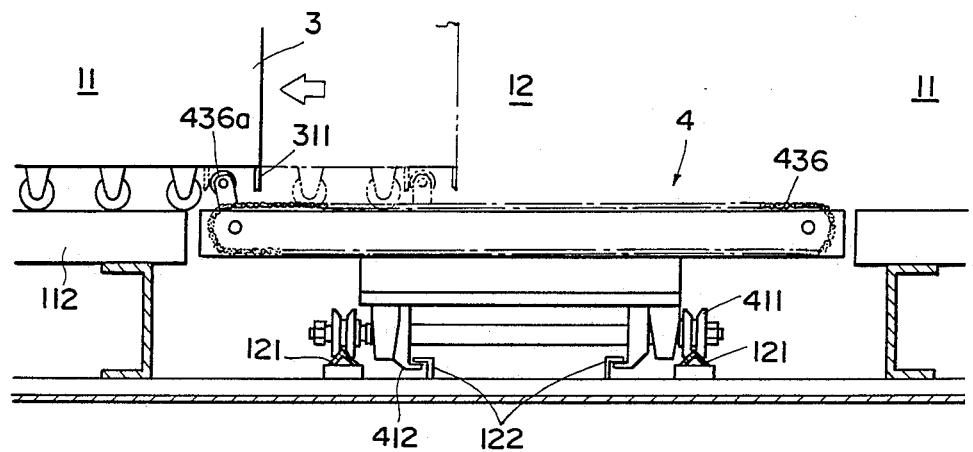
FIG. 13 is a side elevational view, showing a state where the storage unit is pushed in by the transversely conveying device.

In the passageway area 12 are disposed a pair of rails 121 along which the conveying car 4 travels and a pair of guide rails 122. As shown in FIG. 10, each of the rails 121 is an angle bar placed with its angular portion directed upwardly so that the resultant rail has a triangular cross-section. Each of the guide rails 122 is an angle bar placed on the passageway in such a manner that it forms an inverted L-shape.

Figure 7:
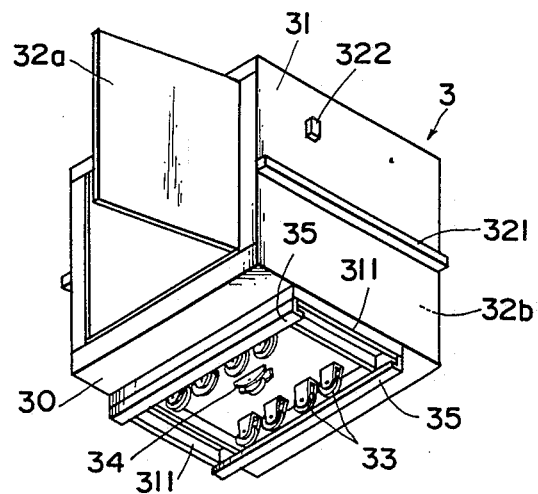
FIG. 7 is a perspective view of a storage unit.

The storage unit 3 has a hollow box-shaped form, as shown in FIG. 7. In this embodiment, neither shelf nor partition is provided within the storage unit 3. However, shelves or partitions may be provided in the storage unit 3 to cope with the objects stored it it.

The storage unit 3 has a pair of downwardly protruding frames 311 formed on a bottom surface 30 thereof. A door 32a is provided on a front surface of the storage unit 3. On the side walls 31 of the storage unit 3 are provided protrusions 321 with which the storage unit is held when it is lifted by the elevator device 2, as well as guide protrusions 322 for guiding the storage unit 3 when it is lifted up.

On the bottom surface 30 of the storage unit 3 are also provided two rows of casters 33 with each row containing a plurality of casters, a positioning caster 34 located between the two rows of casters 33, and travel guides 35 on the outer sides of the casters As shown in FIGS. 6 and 7, the two rows of casters 33 are separated by an interval equal to that at which the rails 112 are formed so that the storage unit 3 can travel along the rails 112. The casters 33 can run exactly on the rails 112 by virtue of the engagement of the travel guides 35 with the travel guides 116 mounted on the rails 112.

The positioning caster 34 is provided near one row of casters 33 in such a manner as to be movable away from and toward the bottom surface 30 of the storage unit 3. The positioning caster 34 is located at a position which corresponds to that at which the positioning device 113 is located in the storage portion 11. When the storage unit 3 is pushed into the storage portion 11, the positioning caster 34 rises on the cam guide 117 of the positioning device 113 and travels. Once the positioning caster 34 enters between the two cam guides 117 and makes contact with the limit switch 118 from above, an electrical signal is transmitted from the limit switch 118 to the control panel 224, indicating that the storage unit 3 has been located at the predetermined position in the storage portion 11.

If the storage unit 3 has a size or a weight which enables it to be drawn out of the storage portion and accommodated in the storage portion, no travelling means such as casters may be provided on the bottom surface of the storage unit 3. Furthermore, it may also be arranged such that the storage unit 3, which has no travelling means, is placed just on the rails 112 in the storage portion 11. In that case, the rails 112 of the storage portion 11 may be provided with rollers so as to facilitate accommodation and the drawing of the storage unit 3. Further, the door of the storage unit 3 may not be provided on the side surface but on the upper surface thereof. Alternatively, an opening may be formed in the storage unit in place of the door so that the objects are taken out and put into the storage unit therethrough.

Figure 8:
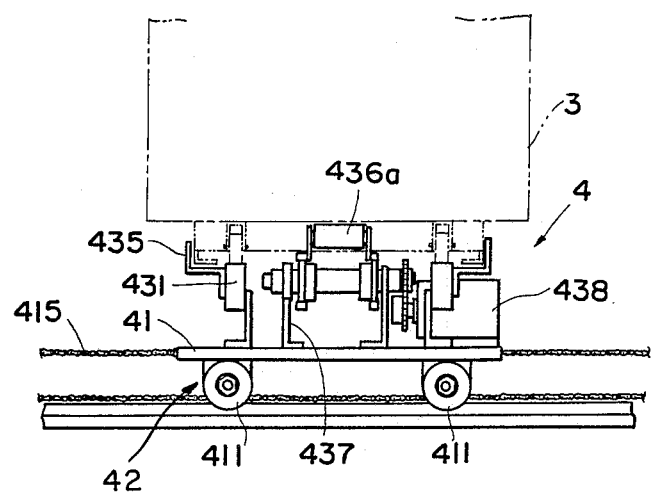
FIG. 8 is a side elevational view of a conveying car.
Figure 9:
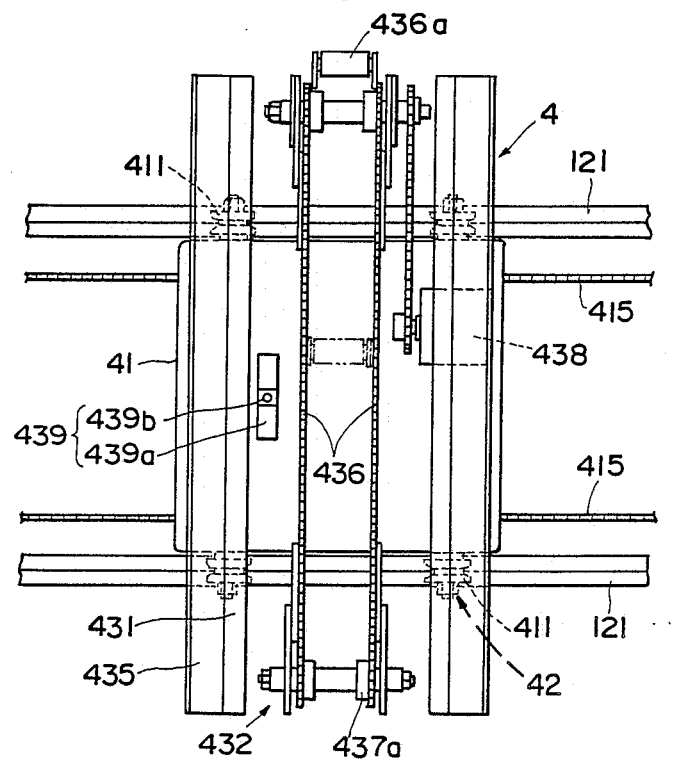
FIG. 9 is a plan view of the conveying car.

As shown in FIGS. 8 and 9, the conveying car 4 includes a rectangular base 41, a wheel/caster assembly or travelling means such as travelling device 42 for moving the base 41 back and forth on the rails 121 in the passageway portion 12, and a transversely conveying device 43 for conveying the storage unit 3 substantially horizontally so as to draw it from the storage portion 11 and push it into the storage portion 11.

The travelling device 42 has travelling wheels 411, guides 412, and a driving device 413, which are provided on the undersurface of the base 41. As shown in FIG. 10, each of the travelling wheels 411 has a drum-like form in which the central portion thereof is recessed so as to receive the rail 121 provided on the passageway portion 12. Each of the guides 412 has an L-shaped cross-section, and is engaged with the guide 122 provided in the passageway portion 12. Although combinations of the travelling wheels 411 and the rails 121 ensure sufficient travelling stability for the conveying car 4, the engagement of the guides 412 with the guides 122 further increases the stability.

The driving device 413 has a wrapping connector driving device that employs a pair of chains 415 extending in the passageway portion 12 over the entire travelling region of the conveying car 4, a motor accommodated in a space within an elevator tower 21 for driving the chains 415, and a collector plate 417 protruding downwardly from the base 41. The chains 415 are extended between sprockets 415a provided at the two longitudinal ends of the passageway portion 12, and are coupled to the front and rear ends of the base 41. The motor 416 is coupled to the chains 415 through a reduction gear 416a. A plurality of collectors 417a protrude from the collector plate 417 in the transverse direction in such a manner that the forward ends thereof engage with the connectors 115 provided on the base frame 111 of the casing 1.

The transversely conveying device 43 has rails 431, guide rails 435, and a driving device 432, which are provided on the base 41 of the conveying car 4.

The rails 431 are separated from each other by the same interval as are the casters 33 so that the casters 33 can run on these rails 431. The guide rail 435 hangs from each of the rails 431 to the outer side. The guide rails 435 have the function of restricting the movement of the guides 35 of the storage unit 3.

The driving device 432 has a pair of chains 436 that move back and forth in the direction of the transverse movement of the storage unit 3, supporting bases 437 around which the chains 436 are wound, a motor 438 for driving the chains 436, and a positioning device 439 for allowing the storage unit 3 to be located at a fixed position on the conveying car 4 and for detecting that the storage unit 3 has been located at that fixed position. These components of the driving device 432 are all provided on the base 41.

A plurality of engaging rollers 436a are provided between the chains 436 at predetermined intervals. The roller portions of the engaging rollers 436a protrude externally. The supporting bases 436 are a pair of supporting sprockets 437a. The chains 436 extend between these sprockets 437a.

Each of the supporting sprockets 437a is mounted on the base 41 very near the storage portion 11 so that it can be located immediately below the protruding frame 311 of the storage unit 3 which is accommodated in the storage portion 11. This allows the engaging roller 436a to be engaged with the protruding frame 311 when the chains 436 are rotated so as to draw the storage unit from the storage portion 11 and push it into the storage portion 11. Although the engaging roller 436a is engaged with the protruding frame 311 during the rotation of the supporting sprockets 437a only through a predetermined angle, in this embodiment, the engaging roller 436a does not separate from the protruding frame 311 until after the storage unit has been fully drawn on the conveying car 4 (see FIG. 14).

The positioning device 439 has a pair of cam guides 439a, and a limit switch 439b. It is constructed and operated in the same manner as that in which the positioning device 113 in the storage portion 11 is constructed and operated. The conveying car 4 is provided with a current position detecting limit switch (not shown) which sends out a signal representing the current position to the control panel 224 when it makes contact with a contact member (not shown) provided in the passageway portion 12.

The elevator device 2 includes the elevator tower 21 and a lifter 22 disposed in the elevator tower 21. The elevator tower 21 has a lower opening 211, which communicates with the passageway portion 12 of the casing 1. The elevator tower 21 also has an upper opening 212 in the upper portion of the elevator tower 21. The upper opening 212, which opens into a room, is provided with hinged double doors 215.

Figure 15:
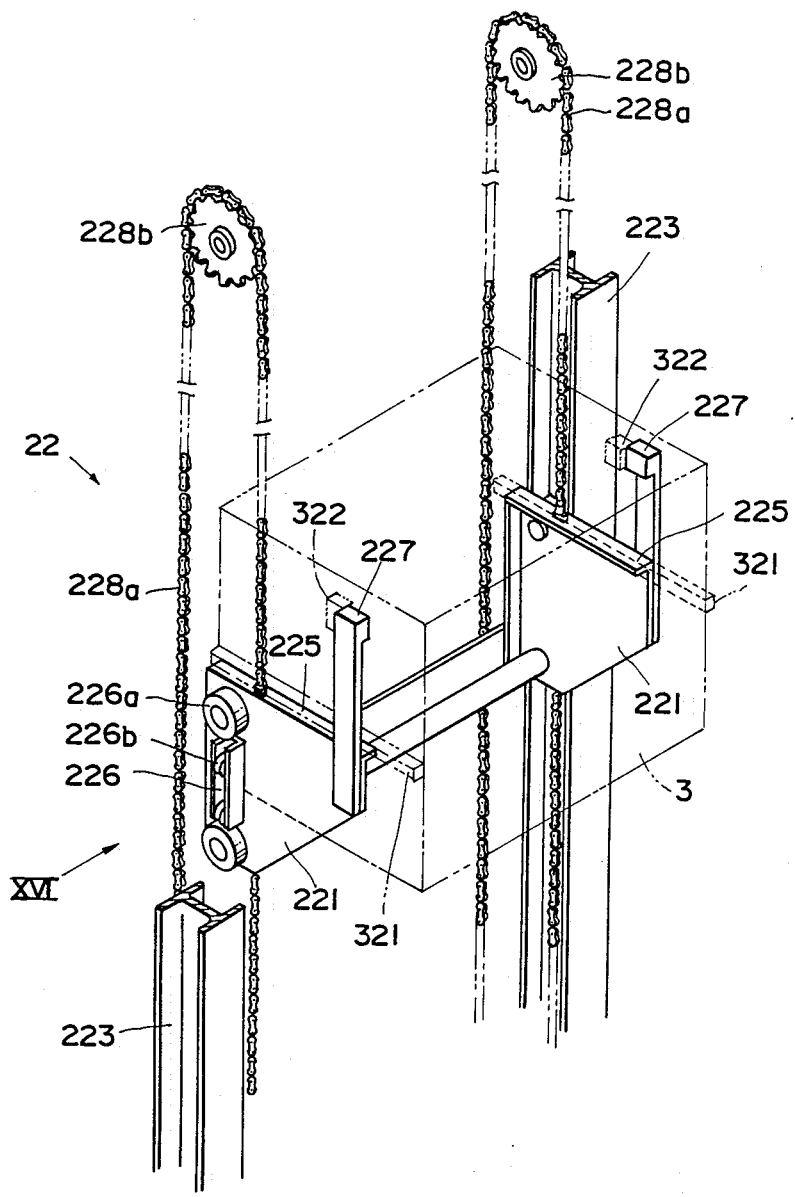
FIG. 15 is an enlarged perspective view of a lift of an elevator device.

As shown in FIG. 15, the lifter 22 has a pair of holding plates 221 used to lift the storage unit 3, a driving device 222 for driving the holding plates 221, and a pair of guide rails 223 for guiding the movement of the holding plates 221. The driving device 222 is a wrapping connector driving device that employs a pair of chains 228a and a motor 229. The chains 228a are extended between sprockets 228b disposed in the upper and lower portions of the elevator tower 21. The motor 229 is coupled to the sprockets 228b provided in the lower portion of the elevator tower 21.

In this embodiment, each of the holding plates 221 is made of a hexagonal plate which is disposed in such a manner that the oblique line and the shortest side of the hexagon are directed downward. The upper and lower sides of the plate are coupled to the chain 228a. The edge portion of the longest side of the plate is bent toward the other holding plate 221 to form a receiving edge 225 used to lift the storage unit 3. A guide block 226 is fixed on the holding plate along the long lateral side, and a guide bar 227 protrudes upward from the short lateral side of the plate 221.

The pair of holding plates 221 are coupled to each other by a coupling member 221a. The holding plates are separated from each other at an interval slightly larger than the width of the storage unit 3, and this allows the holding plates to hold the storage unit 3 placed on the conveying car 4. The receiving edges 225 have the function of supporting the protrusions 321 provided on the walls 32 of the storage unit 3 from below and of receiving the load of the storage unit 3 while it is being moved in the vertical direction. The guide bars 227 make contact with the guide pins 322 provided on the walls 32 of the storage unit 3 and support the storage unit 3 so that it does not fall in the direction indicated by the arrow X in FIG. 16 while it is being moved in the vertical direction. In order to allow the the storage unit 3 to be conveyed between the lifter 22 and the conveying car 4, the chains 228a are coupled to the pair of holding plates 221 such that they allow the receiving edges 225 of the holding plates 221 to be located slightly below the protrusions 321 of the storage unit 3 placed on the conveying car 4 in the state where the conveying car 4 is located between the holding plates 221.

Figure 16:
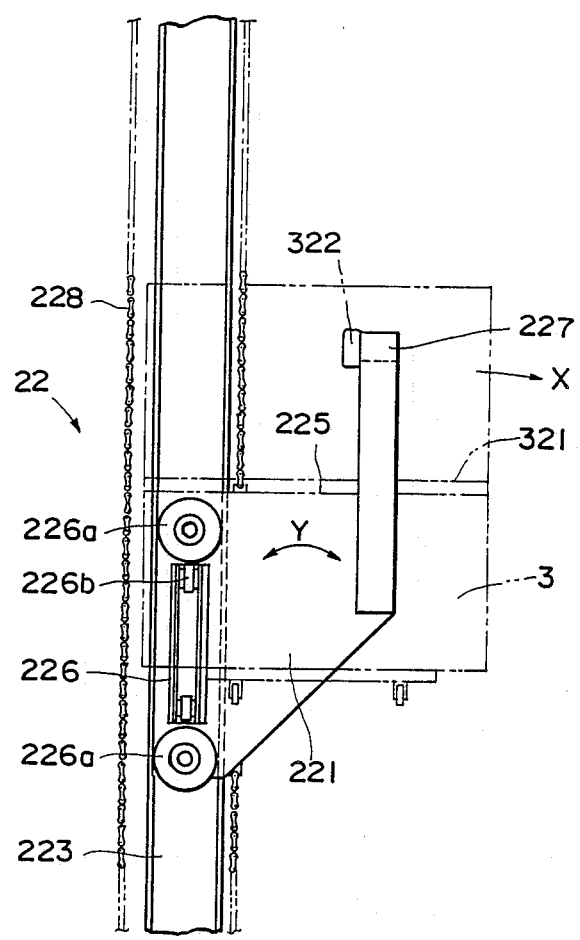
FIG. 16 is a side elevational view of the lift as seen when looking in the direction indicated by the arrow XVI of FIG. 15.

Each of the guide blocks 226 has a pair of large-diameter rollers 226a and a pair of small-diameter rollers 226b. The diameter of the large-diameter rollers 226a is substantially the same as the width of the groove in the guide rail 223. Swings of the holding plate 221 in the direction indicated by the arrows Y in FIG. 16 are prevented due to the engagement of the large-diameter rollers 226a with the groove in the guide rail 223. The small rollers 226b slide along the bottom of the groove in the guide rail 223 and thereby prevent the friction from being generated due to the sliding of the large-diameter rollers 226a along the bottom of the groove in the guide rail 223 while the holding plates are being moved in the vertical direction. A position detecting sensor (not shown) such as a limit switch is provided on the guide rail 223 at a suitable position so that the holding plates 221 can be stopped at predetermined positions.

A door may also be provided in the top surface of the elevator tower 21. In that case, the elevator tower 21 may not protrude from the floor 7, and a lid may be formed in the floor 7. Further, the elevator tower 21 may also be disposed in the direction opposite from that in which it is provided in this embodiment so that the storage unit 3 can be moved downward from the casing 1. This allows the objects to be stored in the storage unit or taken out from the storage unit below the casing 1.

The control panel 224 is provided at the top of the elevator tower 21. It incorporates a key board panel from which control data is input by an operator, and a microcomputer with the control program that operates the travelling device 42 and the transversely conveying device 43 of the conveying car 4 and the lifter 22 incorporated therein.

Next, the operation of this embodiment will be described.

First, power is supplied to the individual components so as to make the whole system ready for operation. The operator then gives the number of the storage portion 11 which accommodates a desired storage unit 3 through the control panel 224. Upon receipt of that instruction, the conveying car 4 travels on the rails 121 in the passageway portion 12 toward the assigned storage portion 11. Once detection is made that the conveying car 4 has reached the assigned position, the conveying car 4 receives another instruction from the microcomputer incorporated in the control panel 224 and thereby stops.

Subsequently, the driving device 432 of the conveying car 4 is driven so as to rotate the chains 436. Since the forward ends of the chains 436 are located below the side wall 31 of the storage unit 3 in the state where the conveying car 4 is in front of the assigned storage portion 11, when the chains 436 are rotated, the engaging roller 436a is brought into engagement with the protruding frame 311 of the storage unit 3. The chains 436 are further rotated and the storage unit 3 is drawn out from the storage portion 11 onto the conveying car 4 (see FIGS. 11 and 12).

Figure 14:
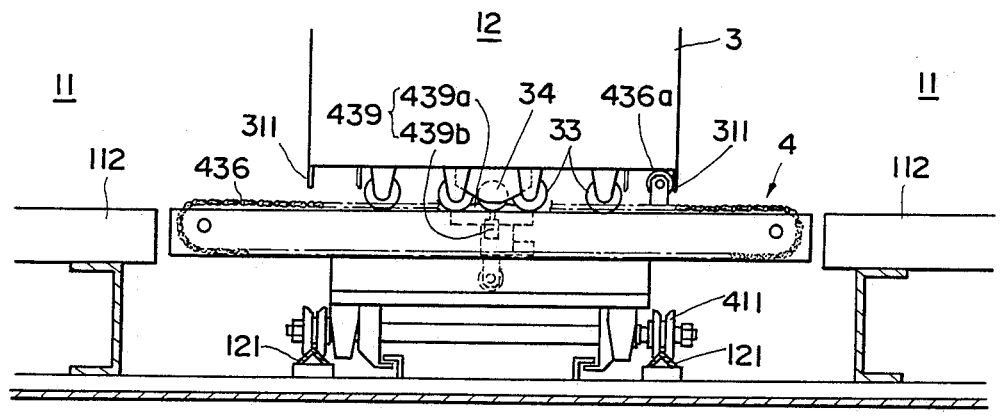
FIG. 14 is a front view of the transversely conveying device with the storage unit placed thereon.

As the storage unit 3 is drawn onto the conveying car 4, the positioning caster 34 provided on the undersurface 30 of the storage unit 3 rises on the cam guide 439a of the positioning device 439 from one side thereof and falls between the pair of cam guides 439a (see FIGS. 5 and 14). The positioning caster 34 then makes contact with the limit switch 439b which protrudes from between the cam guides 439a, and this enables the microcomputer in the control panel 224 to detect that the storage unit 3 has been drawn onto the conveying car 4 to the predetermined position. Thus, the drawing operation of the storage unit 3 is completed.

Next, the conveying car 4 travels on the rails 121 again toward the elevator tower 21. When detection is made that the conveying car 4 has passed the lower opening 211 and returned to the lifter 22, the conveying car 4 is stopped. In this state, the receiving edges 225 of the holding plates 221 are slightly below the protrusions 321 of the storage unit. As the chains 228a are driven so as to raise the holding plates 221, the receiving edges 225 make contact with the protrusion 321 and the storage unit 3 is thereby lifted up from the conveying car 4.

The storage unit 3 is lifted upward without being tilted due to the engagement of the guide blocks 226 with the guide rails 223 and the contact of the guide bars 227 with the guide pins 322 provided on the storage unit 3. Once the storage unit 3 has been lifted to the upper opening 212 of the elevator tower 21, the chains 228a are stopped. The hinged double doors 215 are then opened in this state to open the door 32a of the storage unit 3 and to accommodate the objects in the storage unit and take the objects from the storage unit.

The transversely conveying device 43 is left in the state where the storage unit 3 has been lifted therefrom so that the engaging roller 436a of the transversely conveying device 43 can be made to engage with the protruding frame 311 of the storage unit again when the storage unit is lowered after the object handling operation has been completed.

After the object handling operation is completed, the operator gives an instruction of returning the storage unit 3 to the storage portion 11 through the control panel 224. The chains 228a of the lifter 22 thereby rotate in the opposite direction to lower the storage unit 3 and place it on the conveying car 4. The conveying car 4 with the storage unit 3 thereon travels in the casing 1 and then stops in front of the storage portion 11 to which the storage unit 3 belongs.

Once the conveying car 4 has been stopped, the operation of the transversely conveying device 43 is started and the chains 436 of the driving device 432 rotate in the opposite direction. The storage unit 3 is thereby pushed into the storage portion 11 by virtue of the engagement of the protruding frame 311 with the engaging roller 436a (see FIG. 13). As the storage unit 3 is pushed into the storage portion 11 along the rails 112, the positioning caster 34 provided on the undersurface of the storage unit 3 rises on the cam guide 117 of the positioning device 113 from one side thereof, and falls between the pair of cam guides 117 (see FIG. 5). The positioning caster 34 then makes contact with the limit switch 118 protruding from between the cam guides 117, and this enables the microcomputer in the control panel 224 to detect that the storage unit 3 has been located in the storage portion 11 at the predetermined position. Thus, the accommodating operation of the storage unit 3 is completed.

Figure 17:
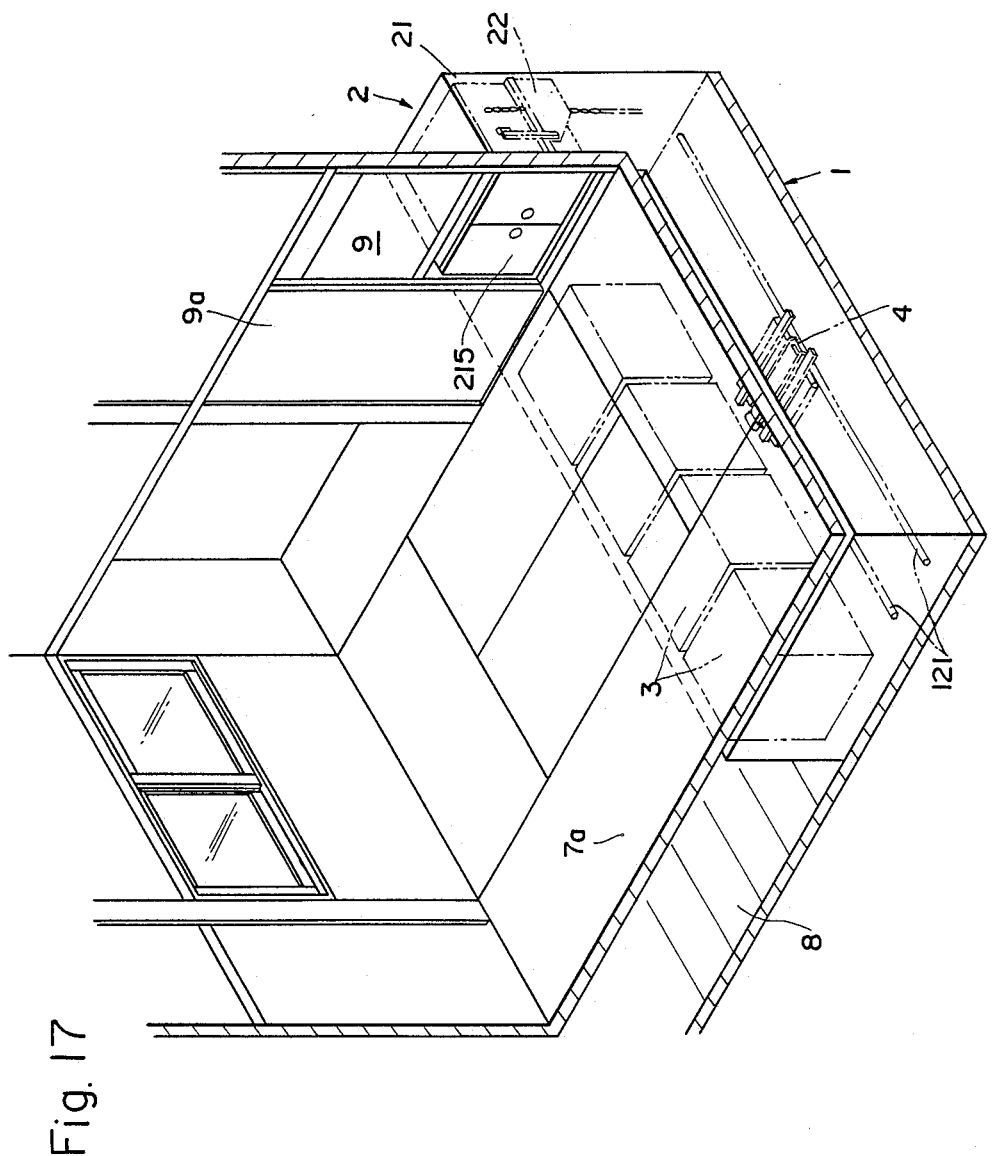
FIG. 17 is a view similar to FIG. 1, showing a second embodiment of the present invention.
Figure 18:
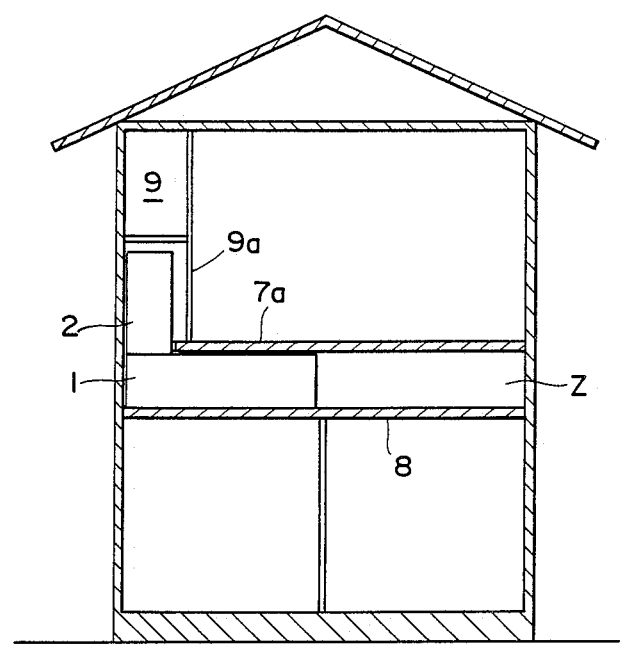
FIG. 18 is a cross-sectional view of a building, showing the arrangement of the embodiment shown in FIG. 17 in the building.
Figure 19:
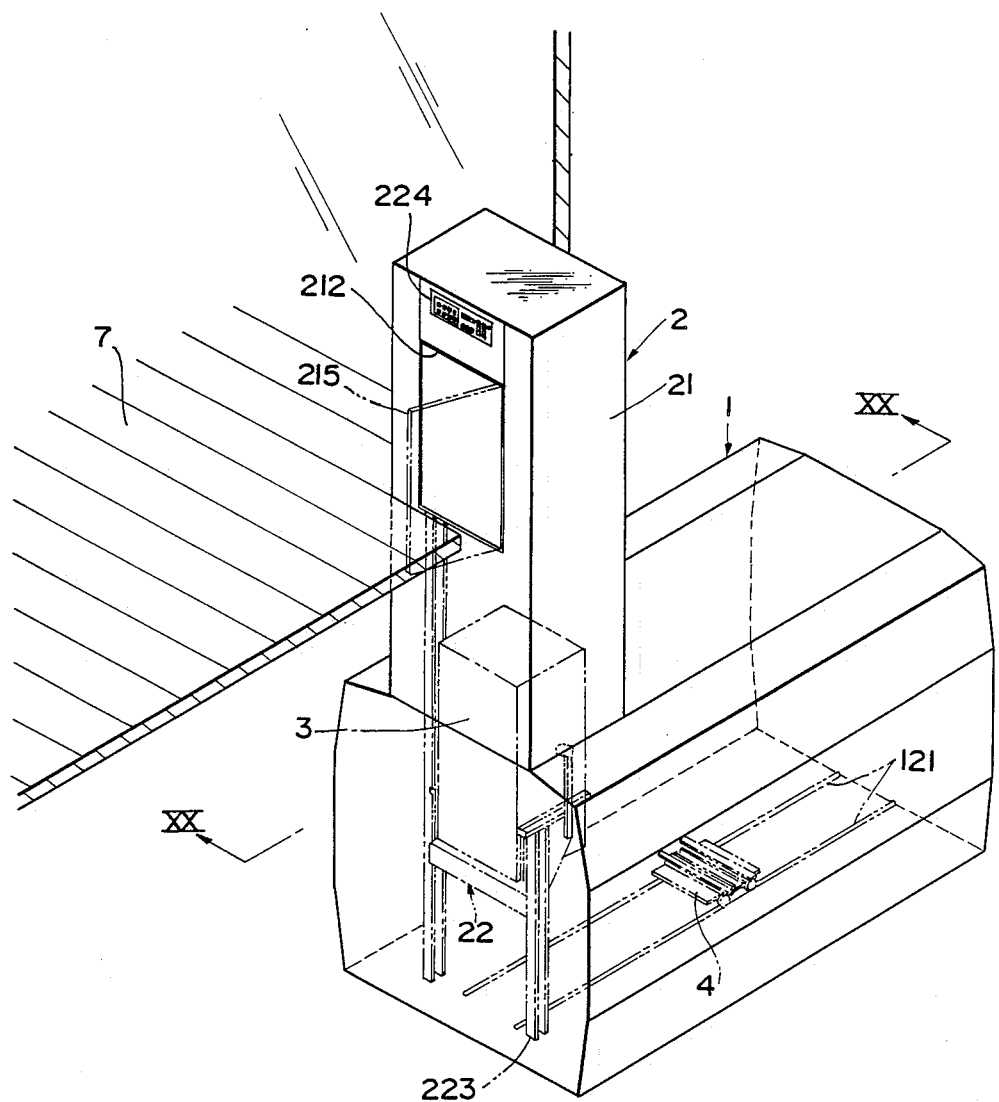
FIG. 19 is a perspective view of a storage facility disposed below the floor, showing a third embodiment of the present invention.
Figure 20:
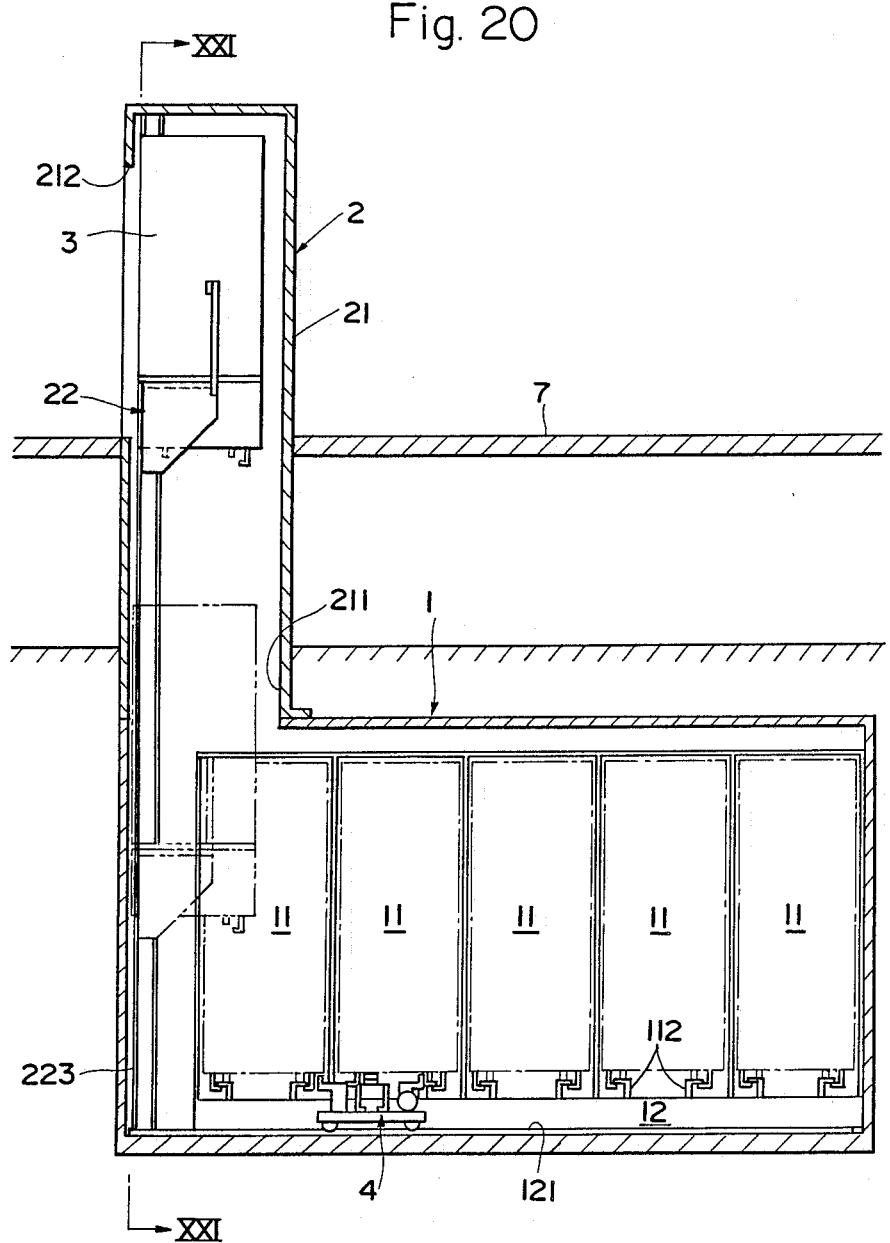
FIG. 20 is a vertical cross-sectional view taken along the line XX—XX of FIG. 19 and seen when looking in the direction indicated by the arrow.
Figure 21:
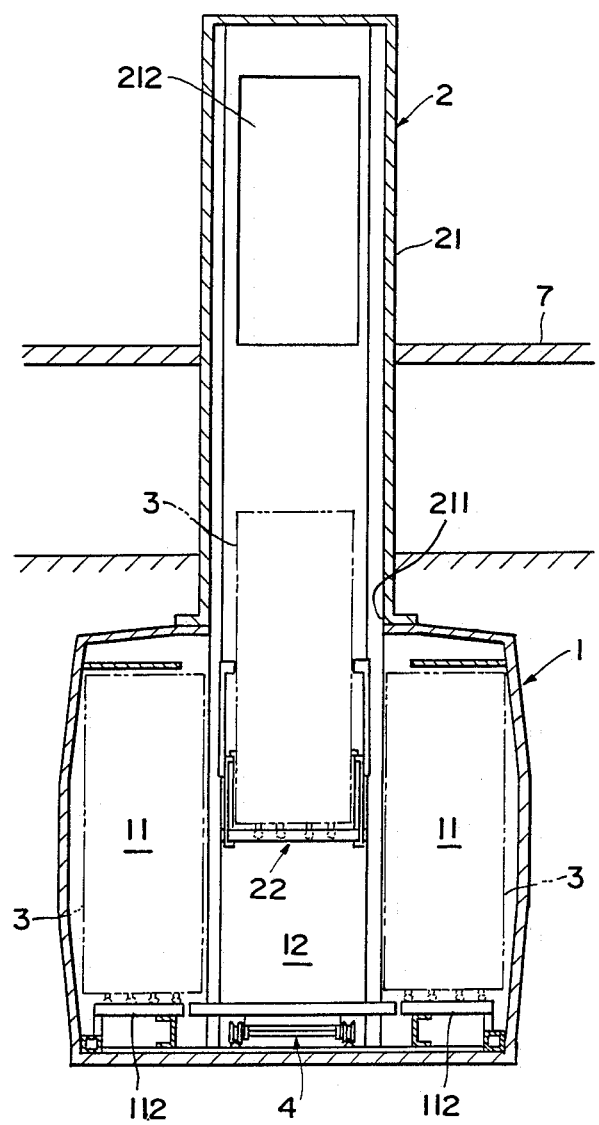
FIG. 21 is a vertical cross-sectional view taken long the line XXI—XXI of FIG. 20 and seen when looking in the direction indicated by the arrow.

FIGS. 17 and 19 show a second embodiment of the present invention. In this embodiment, the same reference numerals are used to denote parts which are the same as or similar to those of the first embodiment.

An indoor mechanized storage facility of this embodiment is disposed in an attic provided between the first and second floors in a building. That is, a relatively large space Z is formed between a ceiling 8 of the first floor and a floor 7a of the second floor, and a casing 1 is disposed in this space. In this embodiment, the casing 1 contains only one row of storage area 6, unlike the first embodiment.

An elevator device 2 protrudes into the lower portion of the interior of a closet 9. The elevator device 2 has a width which enables the hinged double doors 215 to be exposed when a door 9a of the closet is opened.

Other structure and the operation of this storage facility are the same as those of the first embodiment, so the more detailed description will be omitted. In this embodiment, since it is impossible to operate the control panel 224 if it is provided in the top surface of the elevator device 2, it has to be provided in the closet 9 or on the wall of a room at a suitable position.

In this embodiment, the upper portion of the elevator device 2 is not directly exposed in the room, unlike the first embodiment. So, it does not ruin the appearance of the room. Further, it is possible to utilize the closet 9 effectively.

FIGS. 19 to 22 show a third embodiment of the present invention. The same reference numerals are used to denote parts which are the same as or similar to those of the first and second embodiments.

Figure 22:
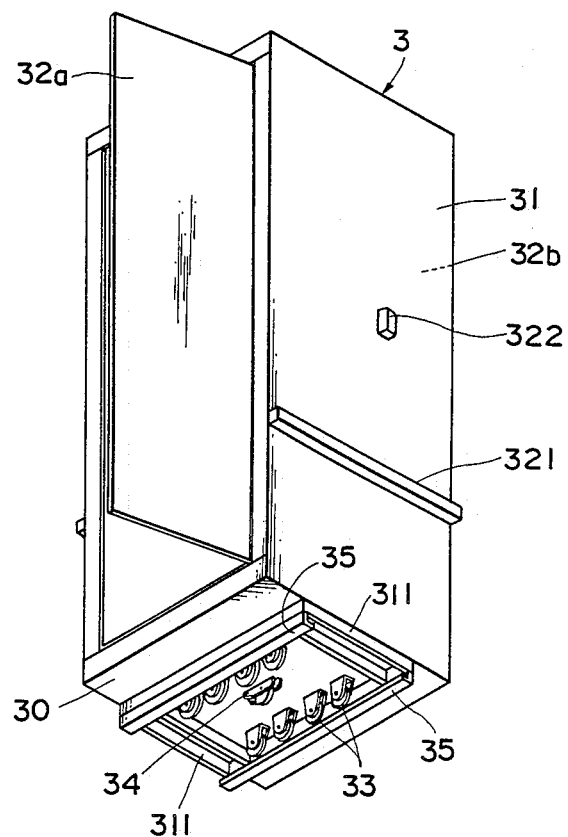
FIG. 22 is a perspective view of a storage unit.

A mechanized storage facility of this embodiment is disposed below the floor of a building that may be an ordinary house or a factory. That is, the upper portion of the elevator tower protrudes from the floor 7, and the casing 1 is buried in the ground. Further, the storage unit 3 is elongated in the vertical direction, as shown in FIG. 22, and the casing 1 and the elevator device 2 are also elongated in correspondence with the storage unit 3.

Other structure and the operation of this embodiment are the same as those of any of the above-described embodiments. So, detailed description will be omitted.

As will be understood from the foregoing description, in the present invention, a plurality of storage portions are aligned with each other in the box-shaped casing, and a passageway portion is formed in front of these plurality of storage portions. Rails are provided in the passageway portion. An elevator device is coupled to this casing. The upper portion of an elevator tower of this elevator device, in which an opening is formed, protrudes into the interior of a building. The casing is disposed in an empty space, below the floor or in an attic of the building. A plurality of storage units are accommodated in the casing. Each of the storage units has a locking member at the undersurface thereof. It also has protrusions at the two side surfaces thereof. The storage unit is conveyed between the casing and the elevator device by a conveying car which travels on the rails. The conveying car has a transversely conveying device which conveys the storage unit substantially horizontally. The transversely conveying device has a conveyor that moves back and forth in the direction in which the storage unit is conveyed transversely. The conveyor has an engaging member which engages with the locking member of the storage unit through a predetermined rotational angle and thereby moves the storage unit. The operations of the conveying car and the elevator device are controlled by a control device. In consequence, in the indoor-type mechanized storage facility of the present invention which is small enough to be moved from one place to the other, the objects stored in the casing can be taken out from the storage unit on the floor of the room, or the objects can be stored in the storage unit on the floor. Further, a desired storage unit selected from the plurality of storage units can be conveyed onto the floor regardless of the accommodated position of that storage unit so as to enable the objects to be put in or taken out of the storage unit.

What is claimed is:

1. An indoor-type mechanized storage facility having a size which enables it to be moved from one place to another, which has an opening that opens into the interior of a building, comprising:

a box-shaped casing, an elevator device coupled to said casing a plurality of storage units accommodated in said casing, a conveying car that travels within said casing to convey said storage unit between said casing and said elevator device, and a control device for controlling the operation of said conveying car and said elevator device, said casing being disposed in an empty space associated with said building and contains a plurality of storage portions which are aligned with each other and a passageway portion which is formed in front of said plurality of storage portions, said passageway being provided with rails on which said conveying car travels.

said storage unit having downwardly extending protrusions on the under surface thereof and a pair of protrusions on the two side surfaces thereof at the corresponding positions, wherein said conveying car includes a travelling device that moves back and forth on said rails, and a transversely conveying device that conveys said storage unit substantially in the horizontal direction or to away from said storage portion, said transversely conveying device having a conveyor that moves back and forth in the direction in which said storage unit is transversely conveyed, and said conveyor having an engaging member that engages with said downwardly extending protrusion of said storage unit through a predetermined rotational angle and thereby draws or pushes said storage unit.

wherein said transversely conveying device is a wrapping connector driving device that employs a pair of chains, and wherein said engaging member extends between said chains, and wherein said elevator device includes an elevator tower and a lift which is provided in said elevator tower in such a manner that it can rise and fall, the upper portion of said elevator tower having an opening and the lower portion of said elevator tower communicating with said passageway portion and said lift having supporting members which holds said protrusions provided on said side surfaces of said storage unit from below and lift said storage unit from said conveying car.

2. An indoor-type mechanized storage facility according to claim 1, wherein said upper portion of said elevator tower protrudes into a room or closet.

3. An indoor-type mechanized storage facility according to either of claims 1 or 2, wherein said storage unit has a positioning member at the undersurface thereof, and wherein said storage portion is provided with a position detecting device that can be engaged with said positioning member.

4. An indoor-type mechanized storage facility according to claim 3, wherein said conveying car is provided with a position detecting device that can be engaged with said positioning member of said storage unit.

5. An indoor-type mechanized storage facility according to either of claim 1, wherein said lift is a wrapping connector driving device that employs a pair of chains, and said supporting members are coupled to said chains, and wherein said storage unit having a width that enables it to be interposed between said chains.

6. An indoor-type mechanized storage facility according to claim 1, wherein said storage portions are aligned in one row.

7. An indoor-type mechanized storage facility according to claim 1, wherein said storage portions are aligned in two rows.

8. An indoor-type mechanized storage facility according to either of claim 1, wherein said casing and said elevator device are separate units which are small enough to be carried from one place to another and then combined to each other.

9. An indoor-type mechanized storage facility according to claim 1, wherein said undersurface of said storage unit is provided with casters with which said storage unit is moved.

10. An indoor-type mechanized storage facility according to claim 1 wherein an opening is formed in the side surface of said storage unit and in the side surface of the upper portion of said elevator device that faces said side surface of said storage unit so that objects are accommodated in said storage unit or taken out from said storage unit.

11. An indoor-type mechanized storage facility according to either of claim 1, wherein an opening is formed in the top surface of said storage unit and in the top surface of said elevator device so that objects are accommodated in said storage unit or taken out from said storage unit.

* * * * *